G. A. LOWRY.
FRUIT CLEANSING MACHINE.
APPLICATION FILED APR. 19, 1911.

1,009,911.

Patented Nov. 28, 1911.

2 SHEETS—SHEET 1.

Witnesses:
Josephine H. Ryan
Charles S. Woodbury

Inventor:
George A. Lowry
by Roberts, Roberts & Cushman
Att'ys.

G. A. LOWRY.
FRUIT CLEANSING MACHINE.
APPLICATION FILED APR. 19, 1911.

1,009,911.

Patented Nov. 28, 1911.
2 SHEETS—SHEET 2.

Witnesses:

Inventor:
George A. Lowry
by Roberts Roberts Buckman
Att'ys.

UNITED STATES PATENT OFFICE.

GEORGE A. LOWRY, OF BOSTON, MASSACHUSETTS.

FRUIT-CLEANSING MACHINE.

1,009,911.  Specification of Letters Patent.  Patented Nov. 28, 1911.

Application filed April 19, 1911. Serial No. 621,985.

*To all whom it may concern:*

Be it known that I, GEORGE A. LOWRY, a citizen of the United States, and resident of city of Boston, in the county of Suffolk and State of Massachusetts, have invented new and useful Improvements in Fruit-Cleansing Machines, of which the following is a specification.

My invention relates to the art of washing, cleansing, drying and polishing fruit, and consists in improved mechanism adapted especially to handling citrous fruits such as oranges.

The objects of my invention are not only to provide automatic mechanism by which the several above-named operations may competently be performed, but also so to handle the fruit, under treatment, as to guard effectively against bruising or damaging the fruit itself. So far as I have observed, the automatic apparatus for cleaning, drying and polishing fruit heretofore in use has been defective in respect to the handling of the fruit itself and has treated the fruit so roughly, occasionally at least, as to bruise the cellular tissues in and underlying the rind or skin, and thus to produce centers of decay.

Another object of my invention is to provide a mechanism by which the cleansing, wiping and drying of the fruit may all be accomplished at practically one operation, and to this end I provide a machine which not only removes dirt from the fruit by gentle mechanical attrition but also performs the function of a drying fan, and is so constituted moreover as to dry itself while in action so that its operating portions are constantly and automatically renewed in this respect.

Figure 1:
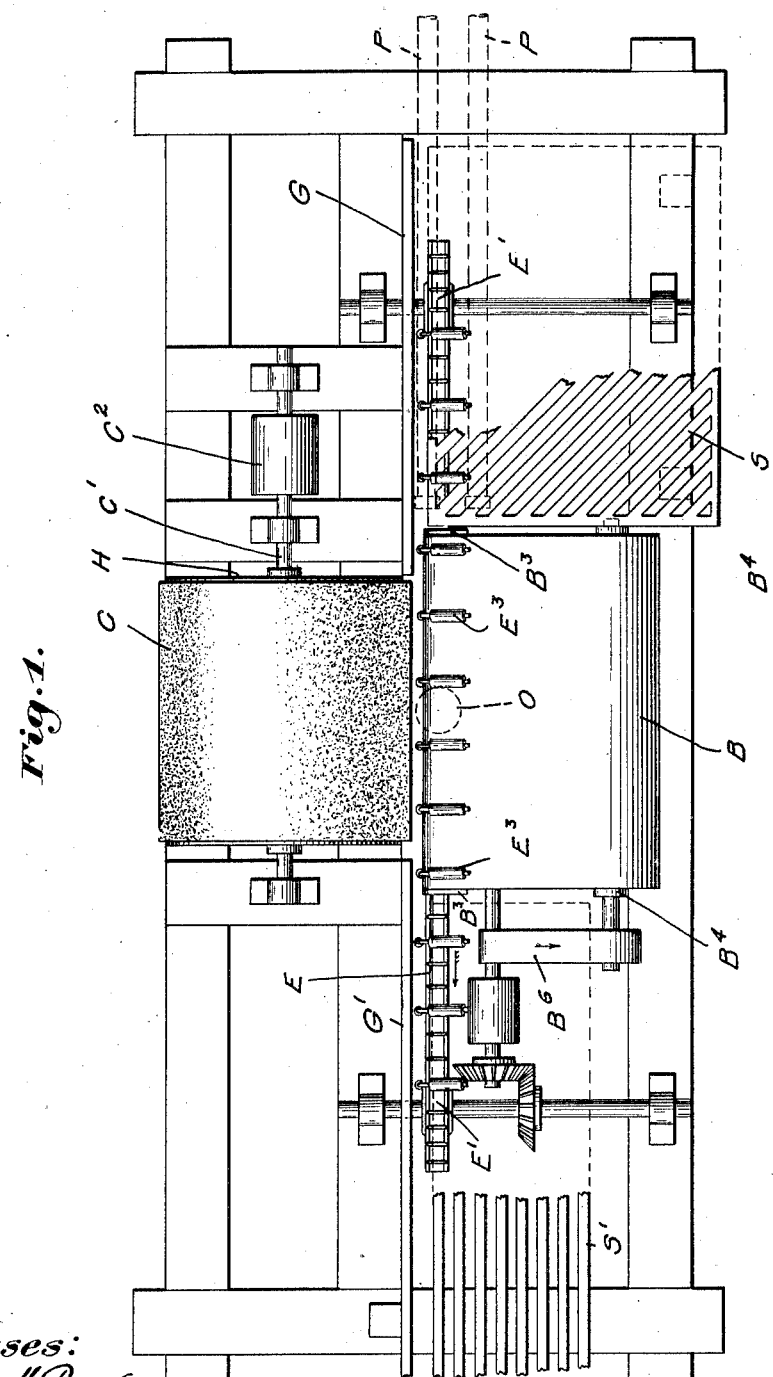
Figure 2:
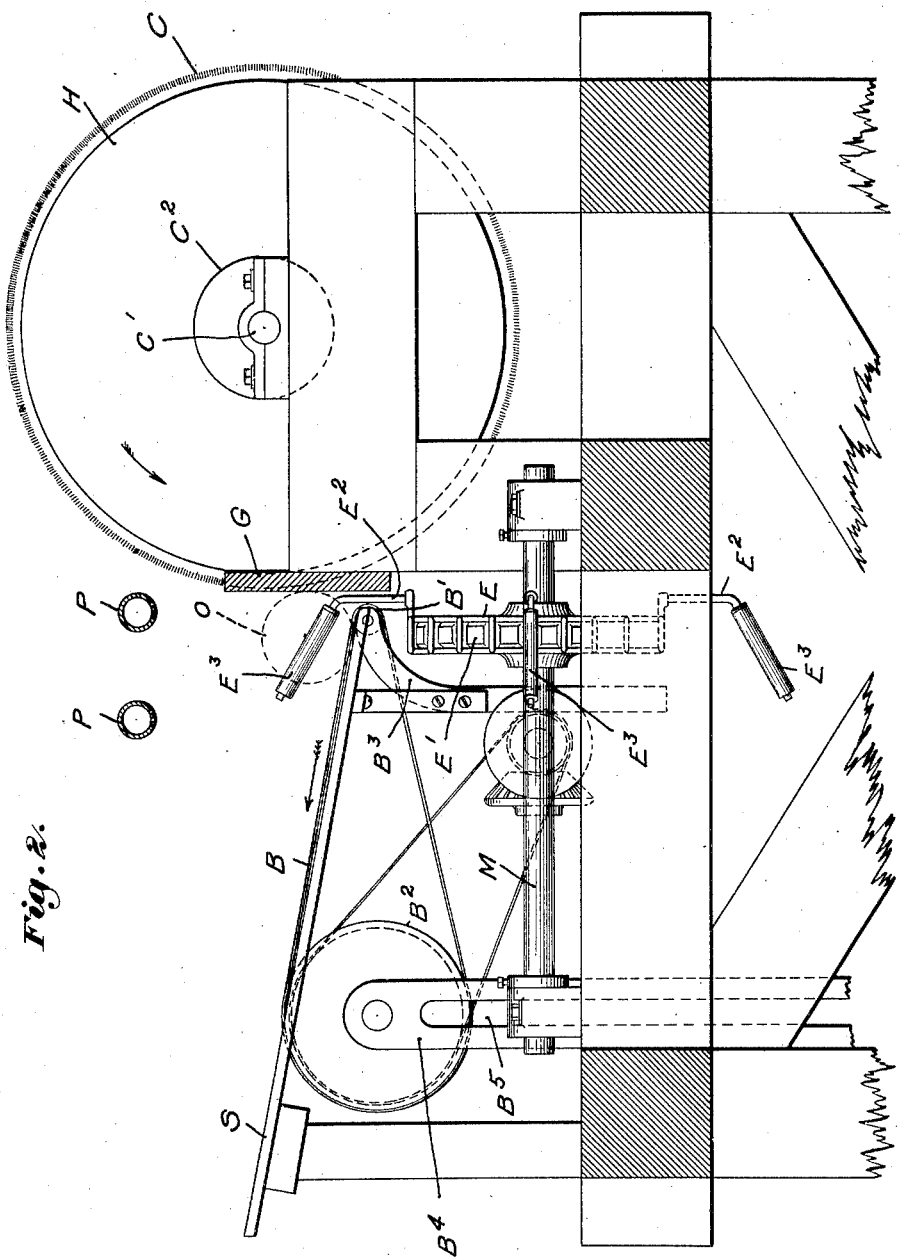

In the drawings hereto annexed which illustrate an embodiment of my invention,—Figure 1 shows a washing, cleansing, drying and polishing machine in plan view; and Fig. 2 shows the same in end elevation.

The principal operating factor in this machine shown in the drawings is the cylindrical cleaner C which from structural analogy I will term the buffer or buffing cylinder. This is mounted upon a shaft C' so as to be rapidly rotated by a belt passing over the pulley C², this rotation being in the direction shown by the arrow in Fig. 2. The buffer C is composed of a large number of disks of textile material clamped between heads H upon the shaft C'. The particular textile material which I prefer and recommend is a soft cotton which unravels or brooms out at the peripheries of the disks in such manner that the buffer as a whole is peripherally armed with limp, fibrous projections each standing out radially, or approximately radially, when the buffer is rapidly rotated. The outermost surfaces presented by the rotating buffer will become less and less limp and yielding as its speed of rotation increases.

When the fruit is brought into fairly close juxtaposition to a rapidly rotating buffer, such as above described, the peripherally projecting fibers, inherently limp but held extended with greater or less rigidity by centrifugal force, gently, but yet effectively, search the irregularities and interstices presented by the surface of the fruit and cleanse it without danger of abrasion or bruising.

In order to present fruit to the cleansing buffer automatically and effectively and so as to offer all parts of the surface of each piece of fruit to the action of the buffer, there is provided in the machine shown in the drawings, a fruit supporting traversing and rolling mechanism as follows: An endless belt, which may be composed of canvas, marked B, is mounted upon rolls B', B², the smaller roll B' lying parallel to the face of the buffer C and mounted upon bearing supports or arms B³. The outer and larger roll B² is mounted at either end to rotate in a standard B⁴, which standard is vertically adjustable as by bolt and nut fastenings (not shown) which coöperate with vertical slots B⁵ in said standards. Movement is imparted to the belt B by means of a belt and pulley connection shown at B⁶ in Fig. 1. The movement of the belt B is such that its upper or fruit supporting surface moves away from the buffer C, that is to say, in the direction of the arrow shown in Fig. 2. Below the inner belt carrying roll B there is mounted the chain E which passes over sprockets at E' (Fig. 1) and is given a movement of traverse so that the upper portion of said chain moves parallel to the axis of the roll B', that is, in the direction of the arrow shown in Fig. 1. Mounted on this traversing chain at suitable intervals are provided the arms E² which extend upward between the roll B' and the buffer C and are then bent forward at an angle so as to overhang the inner end of the belt B, and these overhanging portions of the arms E² are provided with antifriction rollers E³. These arms should be spaced apart evenly at a distance suitable to the size and character of the fruit to be treated; that is to say, the space between two succeeding arms and their antifriction rollers E³ should be sufficient to accommodate the largest piece of fruit of the kind to be handled. This sprocket chain E with its arms E² and associated parts, constitutes the traverser of the machine. When fruits are placed upon the supporting belt B they roll to the inner end of said belt and lie between the arms E² of the traverser; the belt support and the traverser give each piece of fruit a compound rotation, the movement of the belt E causes the pieces of fruit to rotate toward the buffer, while the traverser causes each piece of fruit to roll across the belt B, so that as a resultant of these two actions each piece of fruit rotates on a constantly shifting axis and therefore presents every portion of its surface successively to the action of the buffer.

The traverser is actuated by a train of mechanism comprehensively indicated in Fig. 2 by the letter M.

To complete the functional capacities of this machine there are adjoined to the above described operative factors the receiving, spraying and delivering devices. The receiving devices consist of a number of inclined slats, the upper surfaces of which stand at approximately the same level as the supporting surface of the belt B. These slats are shown in Fig. 1 at S. Over the slats S are mounted the spraying pipes P, these being water pipes with spraying apertures in the under sides thereof through which a water shower is directed upon fruit which is placed on the slats S. If desired, a pan (not shown) may be placed under the slats S to catch and convey away surplus water. At the other end of the belt the slatted platform S' is provided upon which the fruit is delivered after having gone through the operations of washing, cleansing, drying and polishing. The sprockets E' which carry the conveyer chain E are so placed and the chain is of sufficient length that the chain and its fruit pushers, namely, the arms E² with their rollers E³, may operate on the fruit to carry it from the receiving slats S on to the belt B and thence to the delivery platform S'. Retainer boards G, G', are arranged in the rear of the platforms S, S' and chain traverser to prevent the fruit from rolling off the platforms.

In operation the inclination of the fruit supporting surface of the belt B is so adjusted with respect to the size and weight of the fruit and with respect also to the speed at which the buffer C is to be rotated, that each piece of fruit such as the piece marked O, will be impelled but lightly against the surface of the rotating buffer C. The exact angle at which the supporting surface of the belt B should be adjusted to suit any given conditions can, of course, best be ascertained by trial and observation, the greater the angle of inclination toward the buffer, the more vigorous will be the action of the latter. The wet fruit is carried from the slats S by the pushers of the traverser on to the supporting belt, and the movement of the latter immediately begins to rotate each piece of fruit thereon. At the same time the pushers roll the fruit in a transverse movement across the belt and give each piece that rotation on a constantly shifting axis which is functional to present every portion of the surface of the piece of fruit to the action of the buffer.

When the machine is properly adjusted the action of the buffer C is peculiar. The normally limp, flexible, fibrous projections with which the buffer is peripherally armed stand out as a mass of radially extending fibers which may be felt by cautiously approaching the finger to the buffer but which when the buffer is at full speed cannot be seen, or at the most, appear as a faint blur. These invisible or hardly visible fibrous projections impinge upon the rotating and traversing fruit so rapidly and vigorously, and withal so harmlessly, that without any injury to the fruit itself every particle of dirt and moisture is cleansed from the surface of the fruit which apparently does not touch the rotating buffer at all; a clear transparent space is perceptible between the surface of the fruit and that portion of the buffer which is sufficiently solid or compact to be clearly seen as opaque while in rotation. Moreover, the brisk wind or blast caused by the rotating buffer and by the multitude of peripheral fibrous projections therefrom—each of which acts as a minute fan; contributes doubtless to the cleansing action of the machine; this blast contributes still further and more decidedly in the later operation of drying the fruit. Dirt and water is removed from each piece of fruit at an early stage in its traverse across the belt B and afterward the combined effect of the peripheral fibrous projections on the buffer and the blast of air produced thereby, polishes and dries the fruit which passes on to the delivery apron at S' in perfect condition for wrapping.

During the entire operation the fruit is gently handled so that injuries by bruising or compression can not be inflicted upon it.

What I claim and desire to secure by Letters Patent is:

1. In a fruit cleaning machine, the combination of a rotary buffer armed with inherently limp fibrous projections, means to rotate the buffer to cause the normally limp projections to stand out radially, and a support inclined downwardly toward the buffer at such an angle that the impact of the limp fibrous projections sustains the fruit on said support.

2. In a fruit cleansing machine, the combination of a rotary buffer, an endless belt fruit support adjacent to and inclined downwardly toward the buffer, means to move the belt so that its fruit supporting surface travels away from the buffer, means to adjust the inclination of the supporting belt, and an endless chain traverser provided with pushers to roll fruit across the supporting belt.

Signed by me at Wildwood, Florida, this tenth day of April 1911.

GEORGE A. LOWRY.

Witnesses:
 BERTHA McNALLY,
 A. STENGLE.

Copies of this patent may be obtained for five cents each, by addressing the "Commissioner of Patents, Washington, D. C."